(12) United States Patent
Armstrong-Muntner

(10) Patent No.: US 9,007,871 B2
(45) Date of Patent: Apr. 14, 2015

(54) PASSIVE PROXIMITY DETECTION

(75) Inventor: Joel Armstrong-Muntner, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 636 days.

(21) Appl. No.: 13/089,054

(22) Filed: Apr. 18, 2011

(65) Prior Publication Data

US 2012/0263019 A1    Oct. 18, 2012

(51) Int. Cl.
*G01S 3/80* (2006.01)
*G01S 15/00* (2006.01)
*G01S 15/04* (2006.01)
*G01S 15/87* (2006.01)

(52) U.S. Cl.
CPC ............... *G01S 15/003* (2013.01); *G01S 15/04* (2013.01); *G01S 15/876* (2013.01)

(58) Field of Classification Search
CPC ...... G01S 15/003; G01S 15/04; G01S 15/876
USPC .................. 324/115; 330/129, 149, 279, 304; 340/426.24, 426.28, 544, 945; 367/3, 367/99, 118, 119, 129, 136; 379/388.03, 379/390.01; 381/56, 72, 92, 94.1, 94.7, 381/107, 122, 123, 307, 333, 334, 335; 455/90.3, 233.1, 238.1, 456.1, 456.3, 455/569.1; 704/E21.004
See application file for complete search history.

(56) References Cited

U.S. PATENT DOCUMENTS

| | | | |
|---|---|---|---|
| 4,081,631 A | 3/1978 | Feder | |
| 4,658,425 A | 4/1987 | Julstrom | |
| 4,684,899 A * | 8/1987 | Carpentier | .................... 330/149 |
| 5,060,206 A * | 10/1991 | DeMetz, Sr. | .................. 367/136 |
| 5,335,011 A | 8/1994 | Addeo et al. | |
| 5,570,324 A | 10/1996 | Geil | |
| 5,619,583 A | 4/1997 | Page et al. | |
| 5,691,697 A * | 11/1997 | Carvalho et al. | .............. 340/544 |
| 6,073,033 A | 6/2000 | Campo | |
| 6,129,582 A | 10/2000 | Wilhite et al. | |
| 6,138,040 A * | 10/2000 | Nicholls et al. | ............ 455/569.1 |
| 6,151,401 A | 11/2000 | Annaratone | |
| 6,154,551 A | 11/2000 | Frenkel | |

(Continued)

FOREIGN PATENT DOCUMENTS

| EP | 2094032 | 8/2009 |
|---|---|---|
| GB | 2310559 | 8/1997 |

(Continued)

OTHER PUBLICATIONS

Baechtle et al., "Adjustable Audio Indicator," IBM, 2 pages, Jul. 1, 1984.

(Continued)

*Primary Examiner* — Daniel L Murphy

(57) ABSTRACT

Techniques and devices are disclosed for utilizing passively received audio signals to determine proximity of devices to other objects. In one embodiment, a method of passive proximity detection is provided that includes sensing a first sound wave using a first audio transducer and generating a first signal representative of the first sound wave. A second sound wave is also sensed and a second signal is generated. The method includes comparing characteristics of the first and second signals using a processor to determine if differences between the first and second signals indicate the first audio transducer is proximately located to another object.

21 Claims, 12 Drawing Sheets

(56) References Cited

U.S. PATENT DOCUMENTS

| | | | |
|---|---|---|---|
| 6,192,253 B1 | 2/2001 | Charlier et al. | |
| 6,246,761 B1* | 6/2001 | Cuddy | 379/418 |
| 6,317,237 B1 | 11/2001 | Nakao et al. | |
| 6,813,218 B1 | 11/2004 | Antonelli et al. | |
| 6,829,018 B2 | 12/2004 | Lin et al. | |
| 6,882,335 B2 | 4/2005 | Saarinen | |
| 6,934,394 B1 | 8/2005 | Anderson | |
| 7,003,099 B1 | 2/2006 | Zhang et al. | |
| 7,054,450 B2* | 5/2006 | McIntosh et al. | 381/72 |
| 7,082,322 B2 | 7/2006 | Harano | |
| 7,154,526 B2 | 12/2006 | Foote et al. | |
| 7,158,647 B2 | 1/2007 | Azima et al. | |
| 7,263,373 B2 | 8/2007 | Mattisson | |
| 7,266,189 B1 | 9/2007 | Day | |
| 7,346,315 B2* | 3/2008 | Zurek et al. | 455/90.3 |
| 7,378,963 B1 | 5/2008 | Begault et al. | |
| 7,536,029 B2 | 5/2009 | Choi et al. | |
| 8,030,914 B2* | 10/2011 | Alameh et al. | 324/115 |
| 8,300,845 B2* | 10/2012 | Zurek et al. | 381/92 |
| 2004/0203520 A1 | 10/2004 | Schirtzinger et al. | |
| 2005/0271216 A1 | 12/2005 | Lashkari | |
| 2006/0072248 A1 | 4/2006 | Watanabe et al. | |
| 2008/0175408 A1* | 7/2008 | Mukund et al. | 381/94.1 |
| 2008/0204379 A1 | 8/2008 | Perez-Noguera | |
| 2008/0292112 A1 | 11/2008 | Valenzuela et al. | |
| 2009/0247237 A1 | 10/2009 | Mittleman et al. | |
| 2009/0274315 A1 | 11/2009 | Carnes et al. | |
| 2009/0316943 A1 | 12/2009 | Munoz et al. | |
| 2010/0080084 A1* | 4/2010 | Chen et al. | 367/118 |
| 2010/0103776 A1 | 4/2010 | Chan | |
| 2011/0002487 A1 | 1/2011 | Panther et al. | |
| 2011/0033064 A1 | 2/2011 | Johnson et al. | |
| 2011/0161074 A1 | 6/2011 | Pance et al. | |
| 2011/0274303 A1 | 11/2011 | Filson et al. | |
| 2012/0082317 A1 | 4/2012 | Pance et al. | |

FOREIGN PATENT DOCUMENTS

| | | |
|---|---|---|
| GB | 2342802 | 4/2000 |
| JP | 2102905 | 4/1990 |
| WO | WO03/049494 | 6/2003 |
| WO | WO2004/025938 | 3/2004 |
| WO | WO2007/083894 | 7/2007 |
| WO | WO2008/153639 | 12/2008 |
| WO | WO2009/017280 | 2/2009 |
| WO | WO2011/057346 | 5/2011 |

OTHER PUBLICATIONS

Pingali et al., "Audio-Visual Tracking for Natural Interactivity," Bell Laboratories, Lucent Technologies, pp. 373-382, Oct. 1999.

* cited by examiner

PASSIVE PROXIMITY DETECTION

TECHNICAL FIELD

The present application relates to proximity detection and, more particularly, to proximity detection based on audio signals.

BACKGROUND

Proximity detection can be useful in a variety of contexts. For example, proximity detection may be utilized to activate certain devices and/or features of those devices. In particular, a speaker volume and/or display activation may be operatively related to detection of the speaker or display being proximately located with an object. Generally, proximity detection in computing devices and mobile electronic devices has been implemented utilizing infrared (IR), light sensors or, even, active sonar based sensing. However, each of these techniques may include dedicated components which may increase the size, weight and/or cost of manufacture of the devices in which they are implemented.

SUMMARY

Techniques and devices are disclosed for utilizing passively received audio signals to determine proximity of devices to other objects. One embodiment may take the form of a method of passive proximity detection is provided that includes sensing a first sound wave using an audio transducer and generating a first signal representative of the first sound wave. The method also includes sensing a second sound wave and generating a second signal. The method further includes comparing characteristics of the first and second signals using a processor to determine if differences between the first and second signals indicate the first audio transducer is proximately located to another object.

Another embodiment takes the form of a computing device that includes a processor and a storage device coupled to the processor. The storage device stores instructions executable by the processor to determine proximity of the device to another object based on signals. A first audio transducer of the device is configured to sense ambient sound waves and convert the sensed sound waves into an electrical data signal. The device is configured to store a first electrical data signal from the first audio transducer and a second electrical data signal and determine if differences between the first and second electrical data signals indicate that the first audio transducer is proximately located to an object external to the device.

One embodiment takes the form of a communication device configured to passively determine proximity to other objects. The device includes a multi-sided housing having an aperture to allow for receipt and transmission of sound waves therethrough and an audio transducer located within the housing adjacent to the aperture. The audio transducer is configured to sense ambient sound waves. The device includes a processor configured to evaluate signals generated by the audio transducer to determine if the device is in proximity to other objects based on at least one of: a narrowing of a spike about a frequency, an amplification of a spike, an increase in low frequency signals, and a diminution of received sound signals indicating muffling.

While multiple embodiments are disclosed, still other embodiments of the present invention will become apparent to those skilled in the art from the following Detailed Description. As will be realized, the embodiments are capable of modifications in various aspects, all without departing from the spirit and scope of the embodiments. Accordingly, the drawings and detailed description are to be regarded as illustrative in nature and not restrictive.

DETAILED DESCRIPTION

Figure 1:
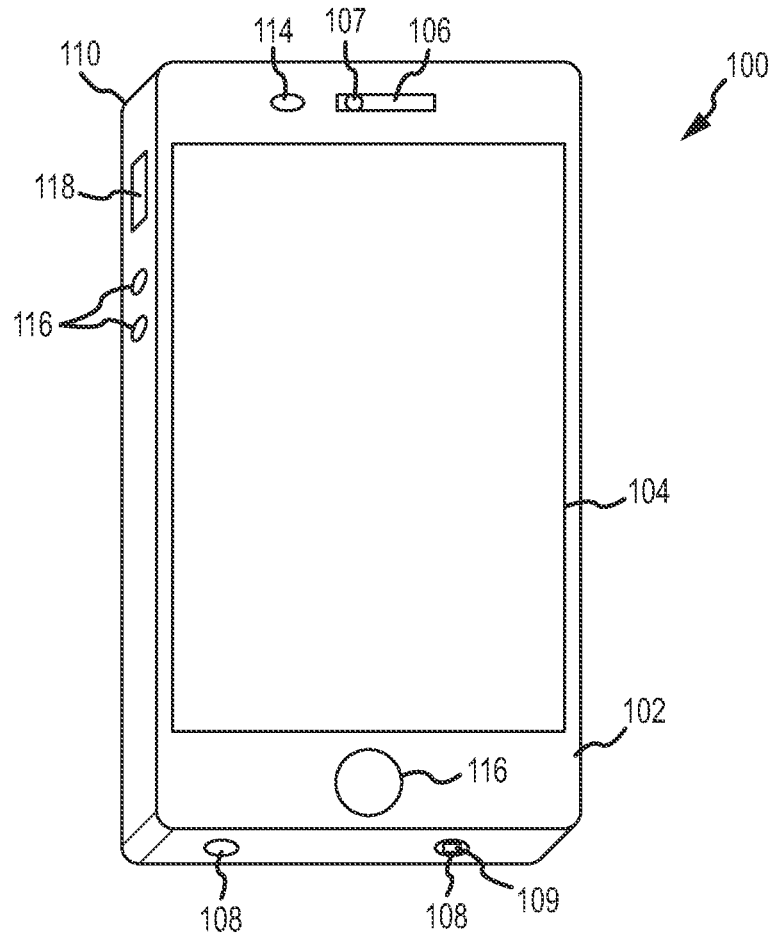
FIG. 1 illustrates an electronic device having at least one audio transducer configured for use in passively determining proximity of the device to other objects.

The use of passively received audio signals to determine proximity of objects to devices such as mobile devices (e.g., media players, phones, and the like) is provided. Generally, audio transducers (e.g., microphones) and each transducer's geometry within the device imprint an equalization curve upon the broad spectrum of audio signals received. That is, audio transducers are subject to a specific set of attenuations based on each transducer's composition and its orientation in space relative to other objects. An equalization curve generally illustrates a relative amplitude of particular frequencies within the spectrum of received sounds.

A given audio transducer's signal equalization curve resulting from a given audio source is generally modified as the microphone is brought near an object or surface, because objects/surfaces variably reflect elements of the sound wave, thereby changing the equalization curve. This effect may be noticed when sound is reflected by soft material as opposed to a hard surface. Generally, sound reflected off the soft surface will seem muted when compared to the same sound reflected off a hard surface located at the same distance and angle from an audio transducer and a sound source. Additionally, a temporary resonant chamber may be created with the device. This may be noticed, for example, by placing a hand over an ear at some angle to simulate a resonant chamber that a device may create. Further, muffling of the incoming sound will result as the surfaces are brought into close proximity such that sound waves from the audio source are obscured or blocked out.

In some embodiments, a comparison of differences in received audio signals at one or more audio transducers, located on different planes of the device, or at some distance from each other along the device, are used to detect proximity of objects. Specifically, per acoustic principles, sound-wave propagation and interference by objects cause detectable shifts in broad-audio-spectrum response to ambient sound to indicate user-presence in close-proximity to the device. To relate this to a common phenomenon, when a sea shell is held up to one's ear a resonant cavity is formed that amplifies ambient sounds. This hi-Q filtering results in the ocean like sounds one hears.

This phenomenon can be demonstrated by analysis of real-time differences between two transducers' signals. For example, if transducers are located on opposite sides of a cell-phone a transducer will produce a relatively hi-Q peak audio-spectrum response relative to the other transducer when the first transducer is brought into close proximity with a surface (e.g., the user's face). In some instances, a comparison may be made based on changes in the response of a single transducer over time. That is, the transducer's response may be monitored when not pressed against the users' face and compared with when it is pressed against or close to the user's face. When the transducer is near the user's face it may provide a relatively hi-Q signal (e.g., peaked in a tight region) or may provide variable but characteristic response in a particular region of the spectrum. The differences in the responses can be amplified by electronic and/or software techniques to increase proximity detection sensitivity.

In other embodiments, a single transducer (such as a microphone) may be used to accomplish proximity detection by comparing before and after signals. In particular, a first sample is taken and used as a baseline for determining proximity detection. This may be referred to as the "before" signal. A second sample is taken (e.g., an "after" signal) and compared to with the first sample to determine if differences between the before signal and after signal indicate a change in proximity.

In some embodiments, the timing of the sampling may be triggered by a user's action. For example, the first sample may be taken soon after a number has been dialed into a cell-phone. The second sample may be taken at some point thereafter (e.g., when the user may be expected to have the device in close proximity to his/her face).

In still other embodiments, live input to a transducer may be utilized to determine when the device is held against a surface (e.g., against a user's face). This input will have relatively high amplitude low-end signals, with attenuated high-end signals. This is generally a tell-tale response of the transducer being in close proximity with a surface and, accordingly, can be interpreted as an indication of proximity. As such, the user's voice may be used to determine proximity. Further, ambient/background noise such as traffic, rushing water, music, conversations, and other ambient noise/sounds may be used for the proximity determination.

In some embodiments, speakers, earpieces, receivers, and the like, which normally transform electrical signals to audible output, can be used as audio input devices/microphones. This may be achieved by switching the connections of the transducers so that electrical signals generated when sound waves cause a diaphragm of the speaker to move may be detected. That is, rather than providing an input signal to the device, a signal generated by the device is sensed as an input.

Turning to the drawings and referring initially to FIG. 1, an example electronic device 100 is illustrated as a smart phone, such as the iPhone® manufactured by Apple, Inc. It should be appreciated that the smart phone is provided merely as an example and that the methods, techniques and so forth discussed herein may be implemented in a variety of different devices, including desktop computing devices, notebook computers, tablet computers, cellular phones, mobile phones, media recorder/player devices, and the like. Generally, the device 100 may include a face 102 having a display 104 and one or more apertures 106 to allow for sound waves to traverse the face 102 and reach or emit from an audio transducer 107. Additionally, one or more apertures 108 may be provided on at least one side other than the face 102 of the device 100 to allow sound waves to reach audio transducers 109. For example, one or more apertures may be provided in a sidewall 110 or on a back side of the device 100 to allow for sound waves to be passed into or out of the device 100. As discussed in greater detail below, the apertures 106, 108, may be located at positions on the device and be shaped to help facilitate certain functionality, such as proximity detection.

In some embodiments, one or more other input/output (I/O) devices may also be provided. For example, a camera 114, one or more buttons 116, and/or switches 118 may be provided and may provide various functionality to the device 100, such as volume control, power control, and so forth.

Figure 2:
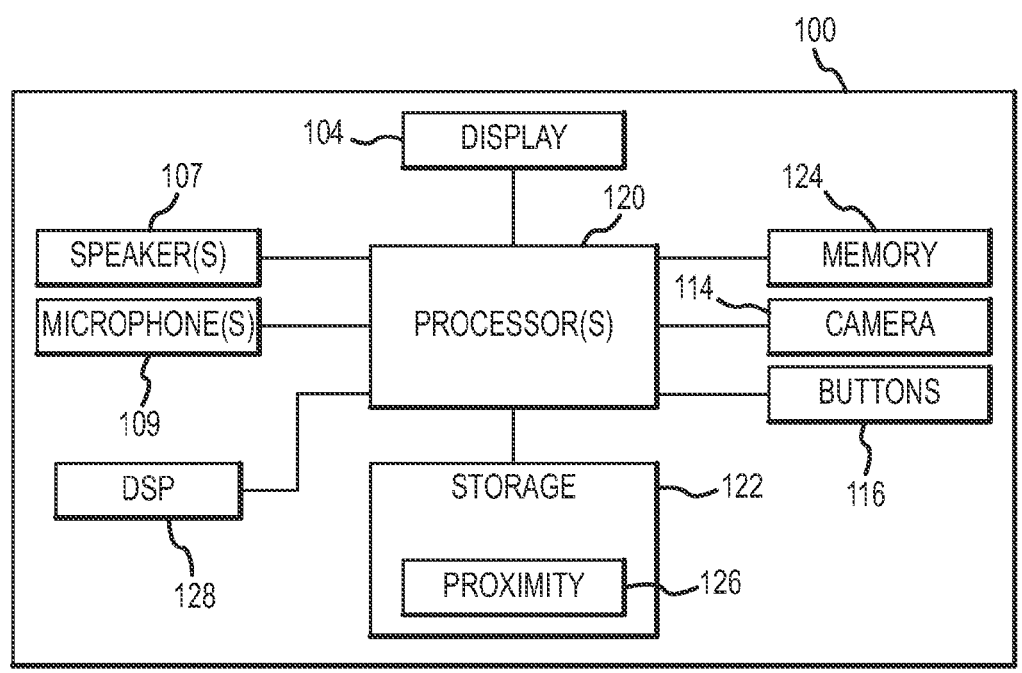
FIG. 2 is a block diagram of the electronic device of FIG. 1.

The device 100 may include one or more processors 120, as illustrated in FIG. 2. A data storage device 122 and a memory device 124 may be coupled to the processor 120. Generally, the storage device 122 may take the form of one or more storage technologies such as flash memory, magnetic disk drives, magnetic tape drives, optical drives, and so forth. The memory device 124 may be implemented in any form of digital random access memory (RAM) including dynamic RAM, synchronous dynamic RAM, and so forth. Generally, the storage device 122 may store operating instructions that are executable by the processor 120 to provide certain functionality. For example, the storage device 122 may store a proximity detection program 126.

Additionally, the I/O devices, such as audio transducers 107, 109; the display 104, the camera 114, and buttons 116, may be coupled to the processor 120 either directly or indirectly. In some embodiments, the processor 120, memory 124 and I/O interfaces may be provided on a single chip as part of a system-on-a-chip (SOC) design, while in other embodiments, the processor, memory and I/O devices may be communicatively coupled together by traces or vias on/in a board. In some embodiments, a dedicated digital signal processor 128 (DSP) may be provided. The DSP may be configured to process received audio signals to determine if the device 100 is in proximity with another object. It should be appreciated that the device 100 can have additional components not shown, or can omit certain components in different embodiments. Thus, the device 100 is shown as a general overview only and is not intended to be exhaustive or indicate all possible connections between components, or all possible component configurations.

Figure 3:
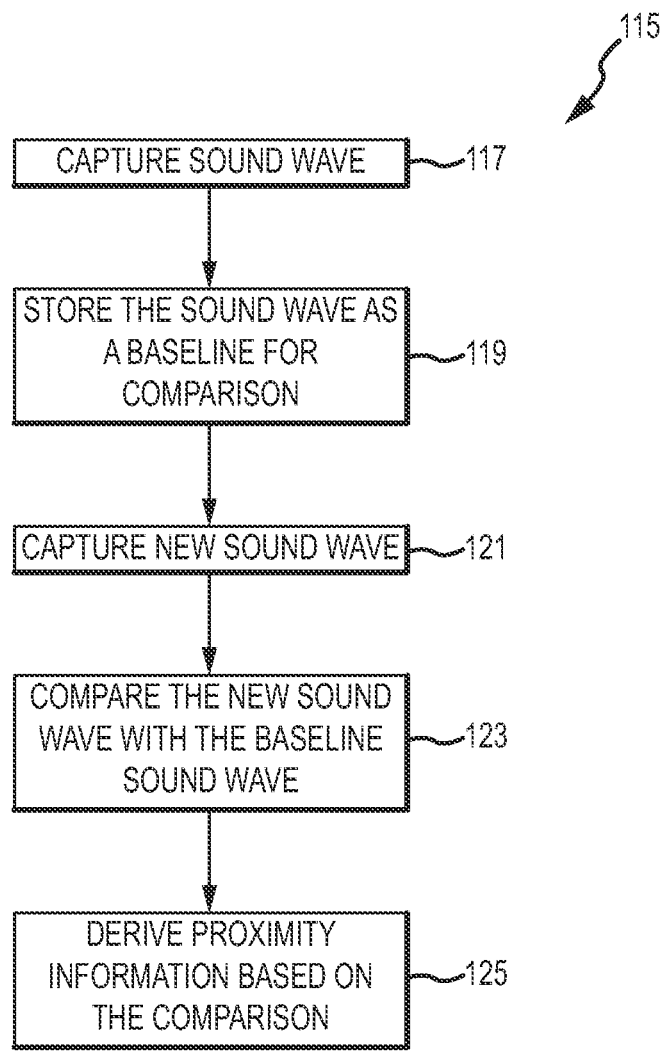
FIG. 3 is a flowchart illustrating a method for utilizing an audio transducer for proximity detection.

Referring to FIG. 3, a flowchart illustrating an example method 115 for utilizing audio transducers for proximity detection. The method 115 includes initially capturing a sound wave (Block 117). The sound wave (or its characteristics) is stored as a baseline for comparison with later captured sound waves (Block 119). A new sound wave is then captured (Block 121) and compared with the baseline sound wave (Block 123). Proximity information is derived from the comparison (Block 125). For example, the comparison may indicate that a transducer is proximately located to another object or not. The proximity information may be derived in a number of different ways, as discussed below.

Figure 4:
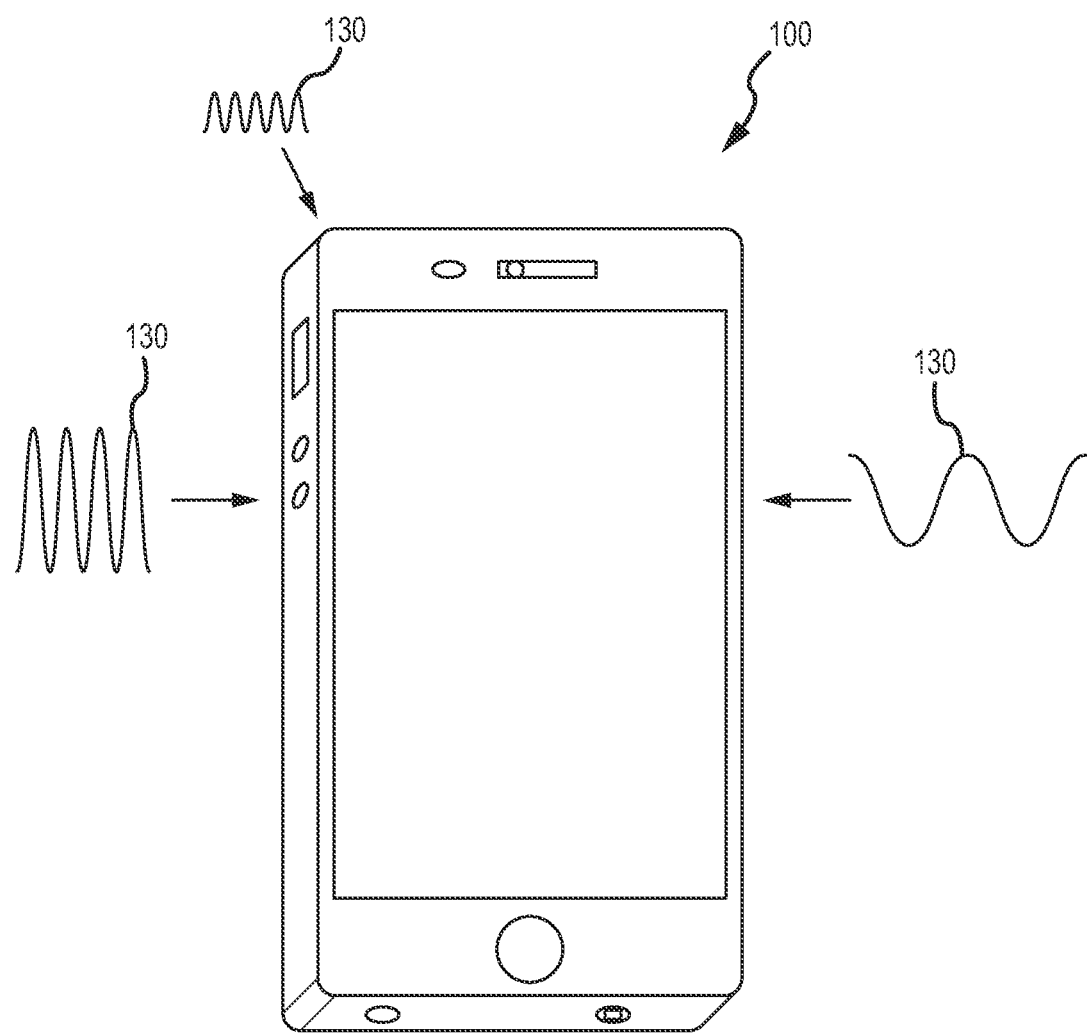
FIG. 4 illustrates ambient sound waves reaching the electronic device of FIG. 1.

FIG. 4 illustrates the device 100 receiving sound waves 130. The sound waves 130 may generally represent ambient sounds that are present within the area the device 100 is located. The sound waves 130 may be sampled and characterized by the processor 120. For example, the amplitude and frequency of the sound waves may be determined by the processor 120 and an equalization curve may be generated indicating the amplitude and frequencies of the sound wave 130. The processor 120 may be configured to execute software that provides an output similar to that of a spectrum analyzer, for example.

Figure 5:
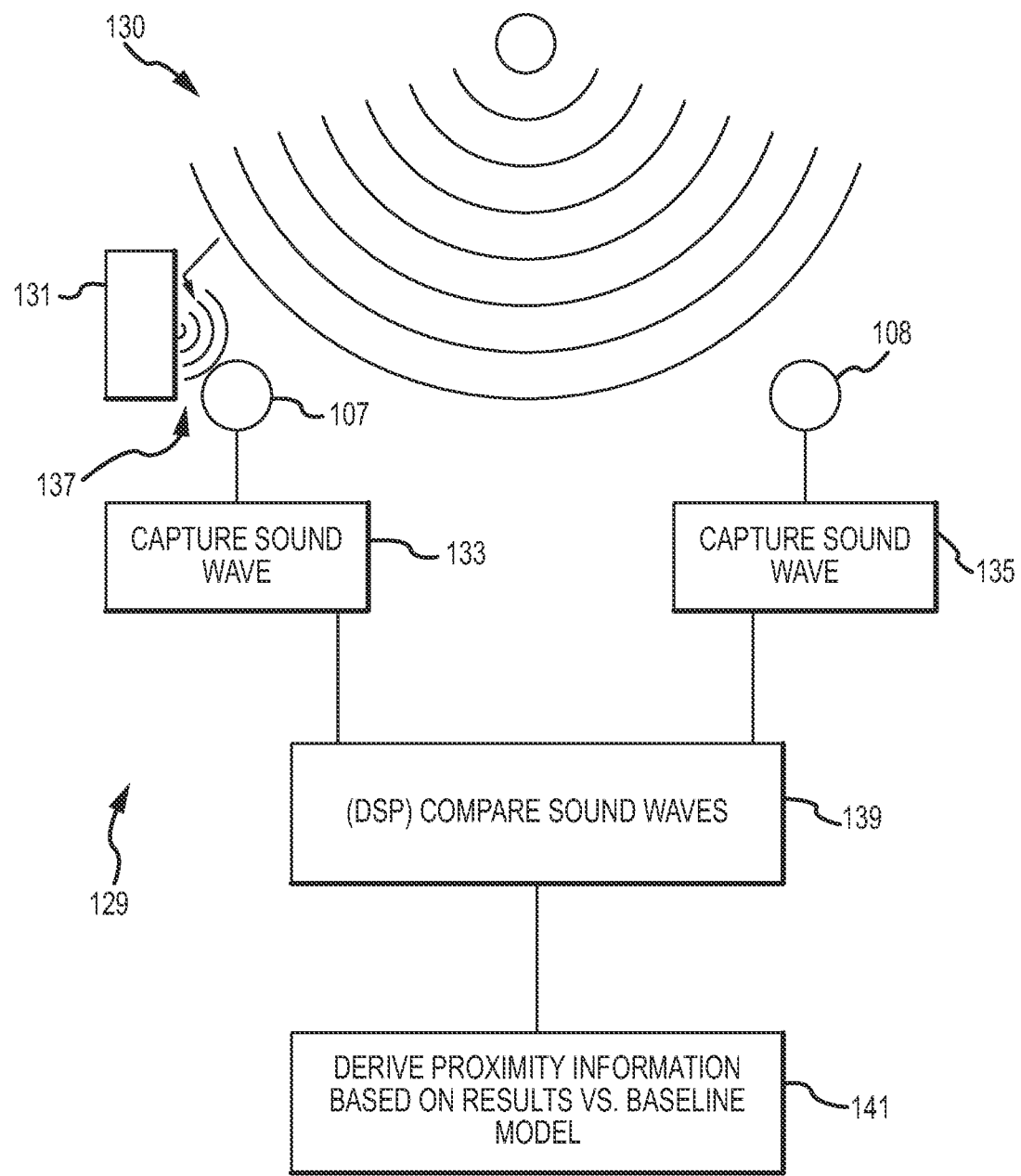
FIG. 5 is a flowchart illustrating a sound wave impacting two audio transducers simultaneously.

FIG. 5 is a flow chart 129 illustrating the sound wave 130 reaching the transducers 107, 108 simultaneously. Additional acoustics are provided by an object 131 (e.g., a user's face) reflecting a sound wave 137 that is detected by the transducer 107. The sound waves 130, 137 are captured (Block 133, 135) by the respective transducers and compared using digital signal processing (Block 139). Further, proximity information is derived based on the comparison results and as compared to a baseline model (Block 141).

Figure 6:
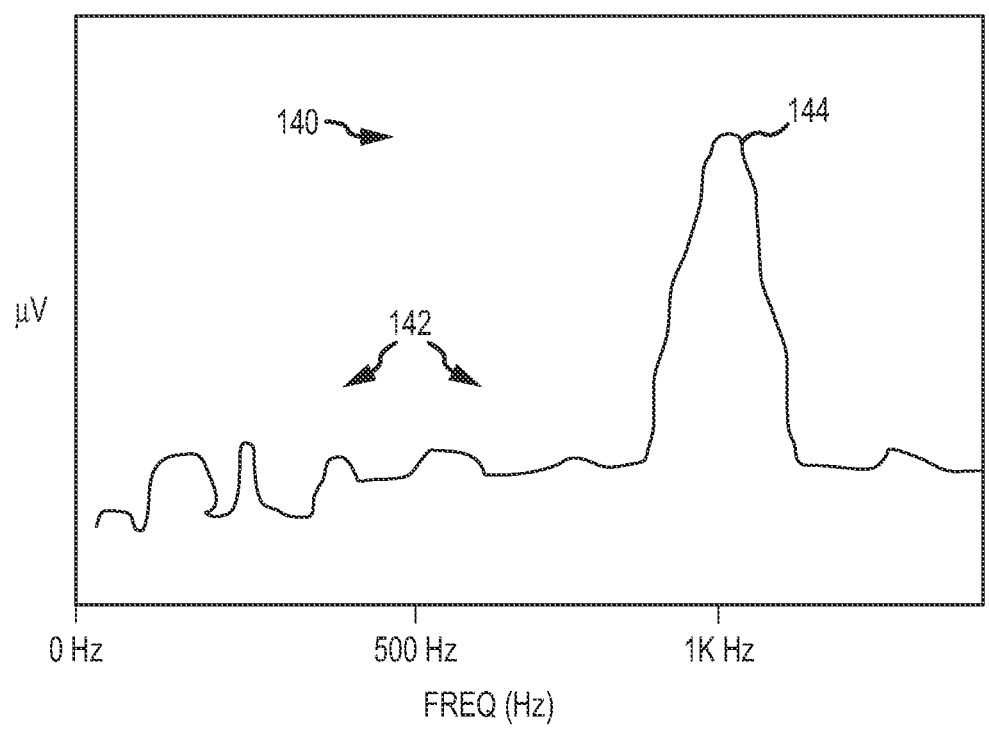
FIG. 6 illustrates an example equalization curve that may be generated when the electronic device of FIG. 1 is not proximately located to another object.

FIG. 6 illustrates an example equalization curve 140 which may generally represent characteristics of the sound waves 130. Generally, the equalization curve 140 shows the sound waves as having noise 142 throughout the spectrum and a broad peak 144 near 1 kHZ. This equalization curve may be utilized as a baseline for comparison with subsequently captured sound waves to determine proximity of objects to the device 100. It should be appreciated, that the peak's frequency is given merely as an example and that the characteristics of an actual implementation may vary based on a variety of factors. However, characteristics may be determined empirically for a particular transducer and in a particular device such that an equalization curve indicative of proximity may be determined for the transducer and the device.

Figure 7A:
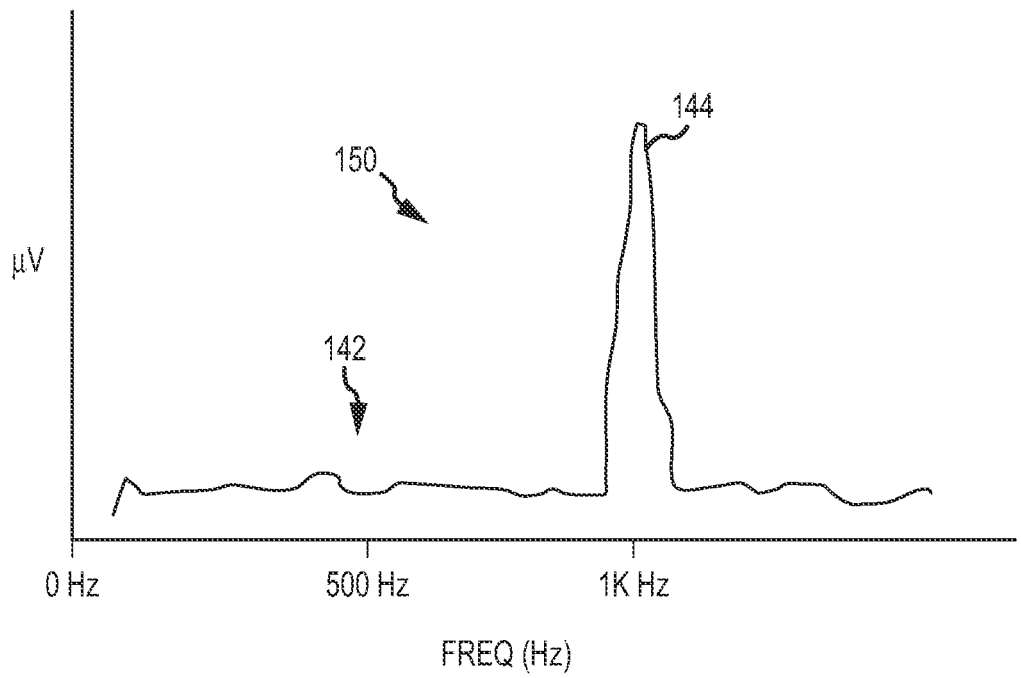
FIGS. 7A and 7B illustrate example equalization curves that may be generated when the electronic device of FIG. 1 is proximately located to another object.
Figure 7B:
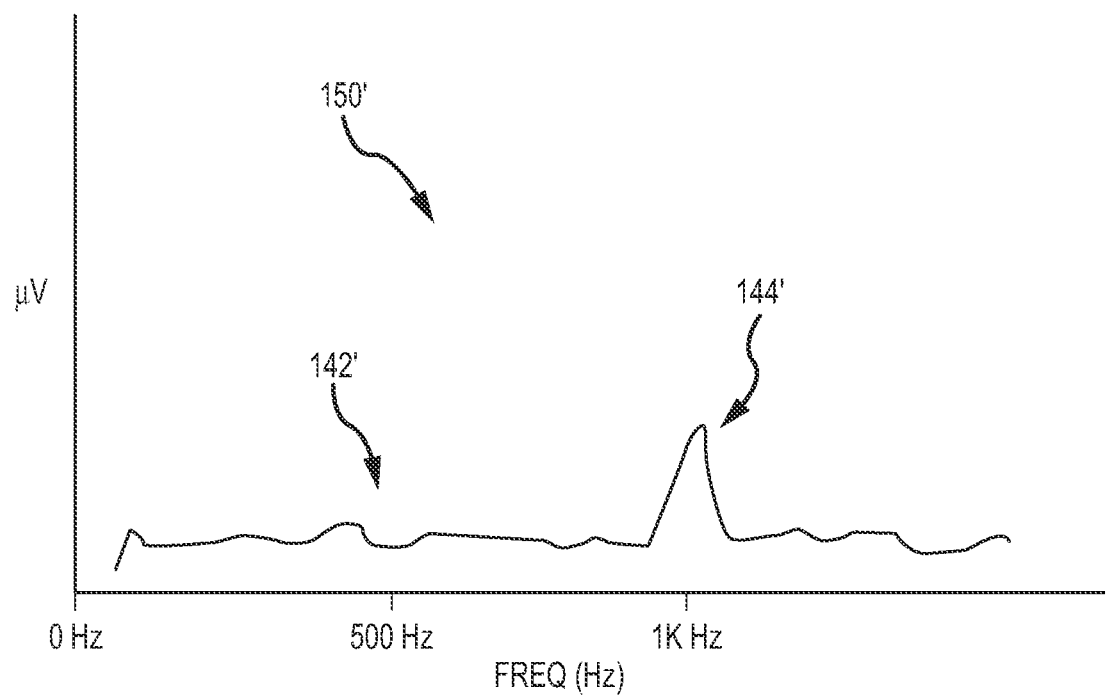
Figure 8:
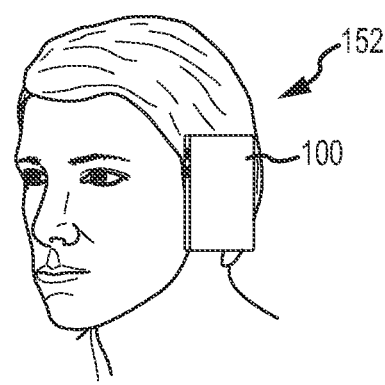
FIG. 8 illustrates the electronic device of FIG. 1 in close proximity to a user's face.

FIGS. 7A and 7B illustrate equalization curves 150, 150' that result when an object is proximately located to the device 100, for example, when the device 100 is held closely to a user's face 152, as shown in FIG. 8. As may be seen, the equalization curve 150 in FIG. 7A is different from the equalization curve 140 of FIG. 5. In particular, the noise 142 has been reduced, while the peak 144 at about 1 kHZ is narrower than that of the equalization curve 140 and it has a higher amplitude (e.g., more strength). This results from the object (e.g., the user's face 152) brought into proximity of the device 100 acting as a bandwidth limiter to effectively limit the frequency band of sound waves that may be received at an audio transducer. Further, certain frequencies are amplified due to resonance based on the characteristics of the device relative to the user's face 152. The sound waves 130 may be both band limited and certain frequencies amplified based in part on the shape and size of the resonant cavity formed by the aperture 106 and/or between the user/object and the device 100. The equalization curve 150' in FIG. 7B shows a similar reduction in noise, but the peak 144' is strongly attenuated relative to the peak 144 in FIG. 6. The strong attenuation may indicate that the device is in close proximity to an object. As such, characteristics of the equalization curve may be evaluated to make a proximity determination.

The differences between the first equalization curve 140 and the second equalization curve 150 may be analyzed using digital signal processing software. For example, fast-Fourier transform windows may be applied to time limited portions of the curves to determine the differences and to determine if a particular equalization curve represents proximity of the device with another object. Further, the differences between the two curves in a given sampled interval may be further amplified by electronics and/or software to increase the sensitivity of proximity detection.

In some embodiments, sound waves 130 may be sensed using multiple audio transducers. For example, a first transducer may be located on the face of the device 100 and a second transducer may be located on a back side of the device. Generally, the signals generated by the two transducers based on the ambient noise will be similar unless one of the sides of the device is located proximately to another object. For example, as the face 102 of the device 100 approaches or is located proximately to a user while in use, the equalization curve from the first transducer may resemble curve 150, while the curve from the second transducer may resemble curve 140. Hence, it may be determined that the face 102 of the device 100 is proximately located to another object.

In other embodiments, a single transducer may be utilized. In particular, samples of sound may be taken by the single transducer at different times (e.g., periodically, intermittently or after certain events have occurred such as after a phone number has been dialed). The samples taken at different times may be compared against each other to determine if there has been any band limiting effects, amplification of certain frequencies, and/or muffling to indicate proximity of the device to another object. In some embodiments, an on-the-fly analysis may be performed with a first sample being taken and then subsequently compared with other samples. Changes that occur relative to the first sample may indicate that the transducer has moved into proximity of an object or that it has moved away from an object (e.g., the first sample was taken while in proximity to the object). Alternatively, profiles may be created for the determination of proximity. That is a proximity profile may be used to compare with the samples to see if the samples approximate the proximity profile. If they do, then it may indicate that the transducer is in proximity with an object.

In some embodiments, one or more directional microphones may be utilized as the audio transducers to take advantage of the proximity effect. The proximity effect generally involves three different aspects of operation of directional microphones, namely: angular dependence, phase difference and amplitude.

Generally, directional microphones are constructed having a diaphragm whose mechanical movement is translated into electrical signals. Movement of the diaphragm is based on air pressure differences from sound waves reaching both a front and rear of the diaphragm. Specifically, sound waves reflected from surfaces behind the diaphragm are allowed to be incident to the rear of the diaphragm, whereas the front of the diaphragm receives direct sound waves. Since the sound waves reaching the rear of the diaphragm travel further, they are out of phase with those that reach the front. This phase difference causes displacement of the diaphragm. The phase difference is accentuated when the source of sound is axial to the diaphragm, as the waves incident to the rear of the diaphragm travel a relatively farther distance than when the sound source is not axial to the diaphragm.

Additionally, the phase difference across the diaphragm is smallest at low frequencies because the difference in path length is a smaller portion of the wavelength of the sound. Further, the amplitude of the sound waves that are incident to the front of the diaphragm is larger than those that are incident to the rear of the diaphragm. This is because of the distance the sound waves travel and the inverse square law of attenuation. Generally, the inverse square law is an extension of the law of conservation of energy and relates to the dispersion of a sound wave as they travel outwardly from a source. Specifically, the energy in the sound wave decreases in amount equal to the inverse of the distance from the source squared. As the source is brought close to the diaphragm, the amplitude component of the pressure differences increases, particularly at lower frequencies. The resulting phenomenon may be seen as an increase in the low end (e.g., bass) signals produced by the microphone and is commonly referred to as the "proximity effect."

Figure 9:
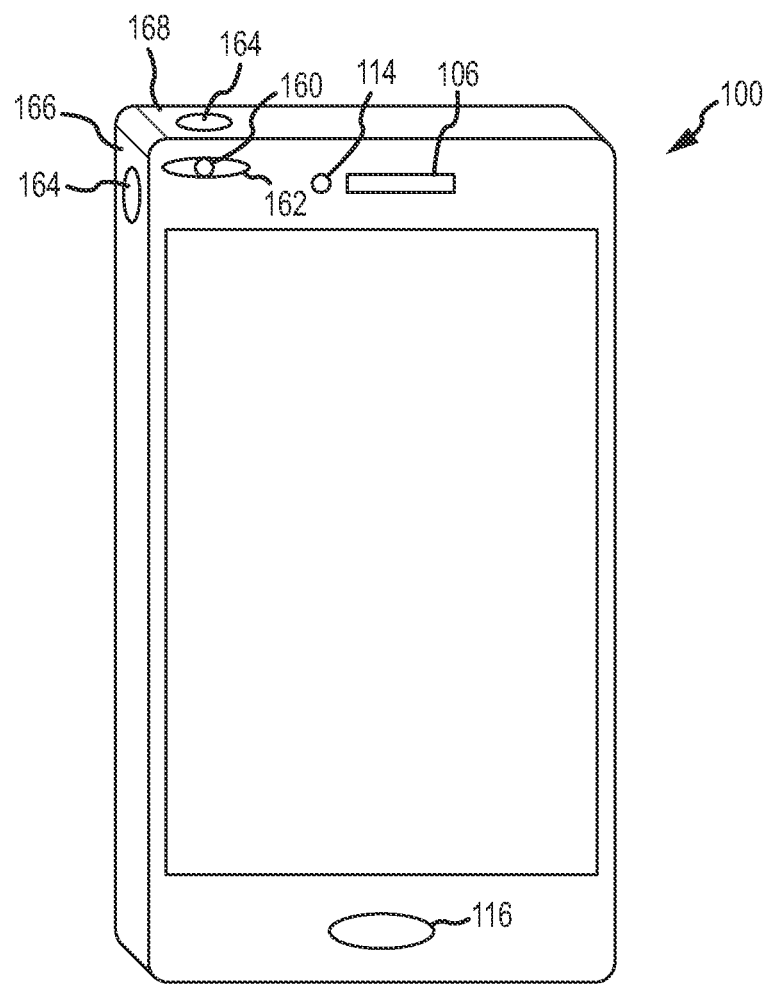
FIG. 9 illustrates the electronic device of FIG. 1 having a directional audio transducer.

FIG. 9 illustrates the use of a directional microphone 160 located in an aperture 162. The aperture 162 allows for the sound waves to reach a first side of a diaphragm of the directional microphone 160. The aperture 162 may be configured/shaped so at to receive sound waves within a particular frequency band and/or amplify such sound waves through resonance. In particular, the aperture 162 may have surfaces that have angles or have been treated so as to diminish sound waves not within a particular band and/or to accentuate sound waves within the desired band. Additional apertures 164 may be provided on a side other than the face 102 of the device to allow for sound waves to be incident to the rear of the diaphragm. As illustrated, the apertures 164 may be located on a side 166 and/or a top 168 of the device 100. In other embodiments, an aperture may be provided on the rear of the device to allow for sound waves to be incident to the rear of the diaphragm. In some embodiments, the apertures 164 may be configured/shaped so as to amplify or resonate at certain frequencies.

Figure 10:
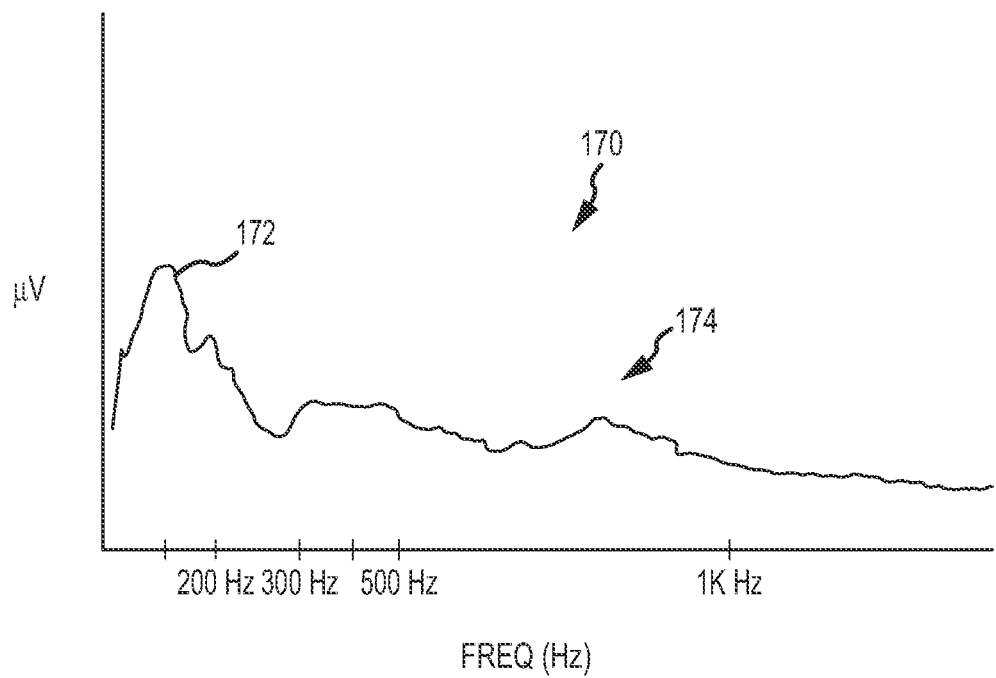
FIG. 10 illustrates an example equalization curve resulting from the proximity effect when the electronic device of FIG. 1 is proximately located to another object.

In some embodiments, characteristics of live input to the transducers while in proximity to an object, such as a user's face, may be used as an indicator of proximity. Due to the proximity effect, the received signals will have a large low end signal and relatively little high end signal, as shown in FIG. 10. Specifically, an equalization curve 170 is shown having a relatively large amount of energy in the low frequency (bass) signals 172 and diminishing energy in higher frequencies. This weighting of the curve towards the low end of the spectrum may indicate that the source of sound (e.g., live input such as a user speaking into the device) is relatively close to the transducer so that the waves incident to the front of a diaphragm are out of phase with and larger relative to those that are incident to a rear of the diaphragm. This technique may be useful when utilizing an audio signal generated by a speaker/transducer for proximity detection. That is, sound emanating from the speaker when the other person speaks, for example, or a dead-air "hiss" sound that comes from the speaker when no one is talking may each be used for the proximity detection. Using the hiss as a proximity source may also effectively use frequency peak analysis techniques for the proximity detection.

This proximity effect may also be useful in the case of the device being located in a confined space, such as a purse or pocket. For example, occasionally, a call may be unintentionally placed while the device is in a confined location such as a purse or pocket. If, when the outgoing ring is sensed by the transducers to be weighted towards the low end of the spectrum, it may be determined that the device 100 is in a confined location, such as a pocket or purse. Upon determining that it is located in a purse or pocket, device 100 may end the call and/or the device may vibrate to let the user know that an inadvertent call has been terminated. In some embodiments, the passive proximity sensing may begin before the outgoing call is even placed. For example, it may begin the moment dialing commences or when a contact is dialed. Additionally, accidental dialing may similarly be treated. In one example, a user may have an odd grasp on the phone (e.g., for a two-finger pinch, front-to-back, with a thumb covering the earpiece hole in which the muffle sensing transducer is located). Instead of dialing, the device may provide a warning tone or vibration and or ask the user if the call should be connected.

Figure 11:
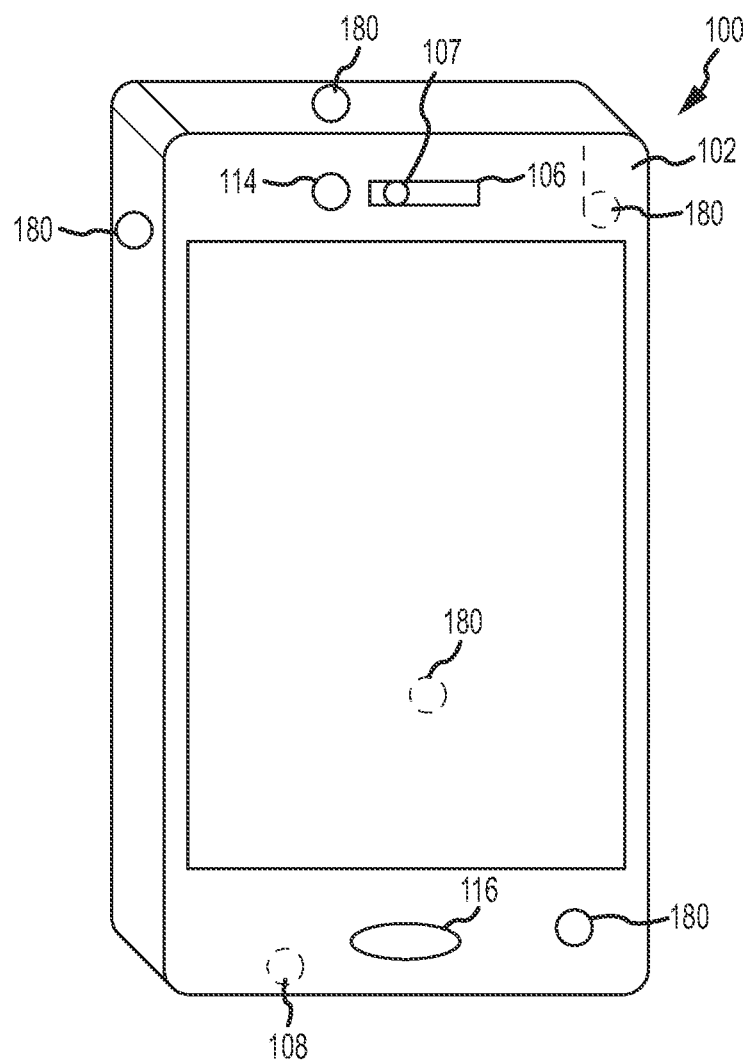
FIG. 11 illustrates the electronic device of FIG. 1 having audio transducers located on each surface plane of the device housing.

Although the examples to this point have included one or two transducers, in some embodiments, more than two audio transducers 107, 108 may be implemented as shown in FIG. 11. The multiple transducers 180 may be positioned at different locations and/or on different surfaces so that proximity of a particular location and/or surface to another object may be determined. That is, for example, each surface of the device may have one or more transducer that may be configured for use in proximity detection. Additionally, the signals from multiple transducers distributed about the housing of the device may provide for more accurate proximity detection and/or allow for proximity detection in multiple planes. Further, one or more of the transducers may be configured for dual use as both a speaker and as a microphone. That is, a speaker may be repurposed by switching its connections so that it may provide audio input into the device 100 for proximity detection. Moreover, the multiple transducers may provide redundancy which may allow for selective utilization of one or more of the transducers and/or disabling other transducers based on the way the device is being held or positioned.

Figure 12:
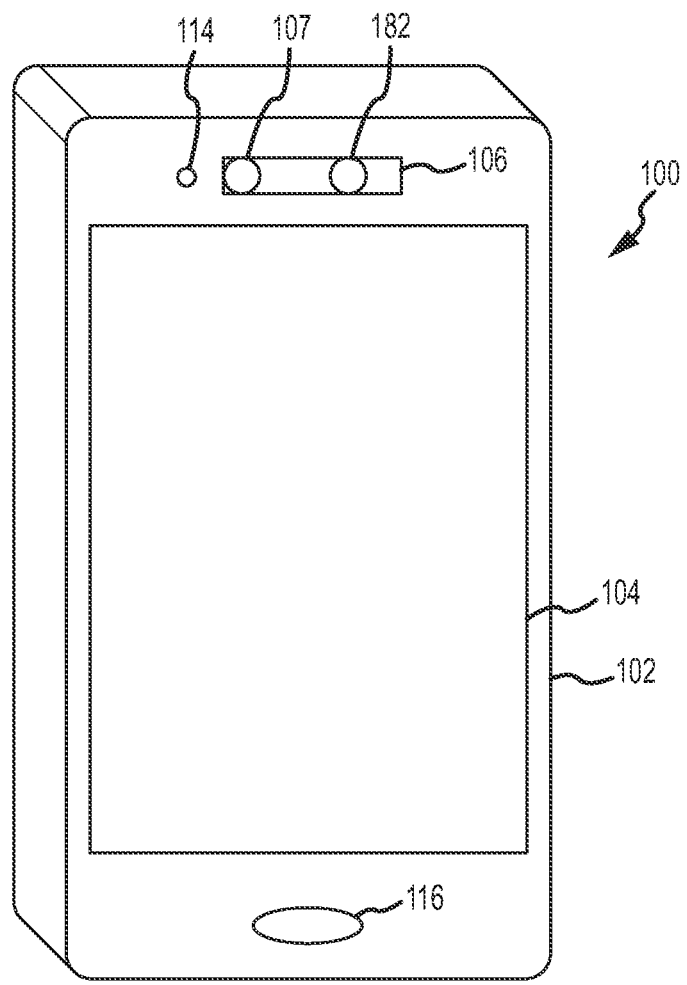
FIG. 12 illustrates the electronic device of FIG. 1 having audio transducers located adjacent to each other.

In some embodiments, a microphone may be positioned adjacent to a speaker of the device. In particular, in some embodiment, a common aperture, such as aperture 106, may be shared by the transducer (speaker) 107 and the transducer (microphone) 182, as shown in FIG. 12. For example, an omnidirectional microphone may be positioned adjacent to the speaker. In some embodiments, the microphone may be included as a shaped capsule near an ear piece of the device. The shaped capsule may be configured to function as a resonant cavity that may accentuate certain frequencies when in proximity to another object. Moreover, the sound emitted from the speaker may be utilized, at least in part, for the proximity determination. That is, the sound originating from the speaker may be sampled and compared for determination of proximity.

In some embodiments, two microphones may be placed adjacent to each other. Specifically, an omindirectional microphone and a directional microphone may be positioned adjacent to each other. The signals from the omindirectional microphone may be compared with one another and with those of the directional microphone to make a determination as to the proximity of the device to an object. In some embodiments, a baseline difference between the signals of the two microphones may be amplified to provide more sensitive proximity detection.

It should be appreciated that the audio transducers discussed herein may be implemented in any suitable form. For example, electric condenser microphones, piezo-electric microphone, micro-electromechanical microphones, dynamic microphones, and so forth may be implemented. Moreover, their polar patterns may include omindirectional, cardiod, directional and/or other patterns. Further, in some embodiments, a narrow band microphone may be implemented to focus attention on a particular band of frequencies. In some embodiments, a band of frequencies outside the range of normal human hearing may be utilized for the proximity determination.

Further, some devices may be configured with multiple microphones that may be utilized and/or repurposed for proximity detection. Additionally, digital signal processing software and hardware may already be provided within existing devices that may be utilized for making the proximity determination. Accordingly, the present techniques may be implemented without significant addition of costs or labor to current manufacture.

The foregoing discussion describes some example embodiments for passively determining object proximity. Although the foregoing discussion has presented specific embodiments, persons skilled in the art will recognize that changes may be made in form and detail without departing from the spirit and scope of the embodiments. Accordingly, the specific embodiments described herein should be understood as examples and not limiting the scope thereof.

The invention claimed is:

1. A method of passive proximity detection comprising:
sensing a first sound wave using a first audio transducer and generating a first signal representative of the first sound wave;
sensing a second sound wave and generating a second signal representative of the second sound wave; and
comparing characteristics of the first and second signals using a processor to determine if differences between the first and second signals indicate the first audio transducer is proximately located to another object, wherein the first and second sound waves are sourced from ambient noise not emitted from the object.

2. The method of claim 1, wherein comparing the first and second signals comprises determining if one of the first or second signals has a spike at a frequency that is narrowed about a frequency relative to the other signal.

3. The method of claim 1, wherein comparing the first and second signals comprises determining if one of the first or second signals has a spike that is amplified relative to a spike in the other signal.

4. The method of claim 1, wherein comparing the first and second signals comprises determining if one of the first or second signals has an equalization curve heavily weighted in a lower frequency band relative to the other signal.

5. The method of claim 1, wherein comparing the first and second signals comprises determining if one of the first or second signals has an equalization curve indicative that a muffling of one of the first or second sound wave has occurred.

6. The method of claim 1, wherein the first and second sound waves are sensed at discrete moments in time.

7. The method of claim 1, wherein the first and second sound waves are the same sound waves and the second sound wave is sensed by a second audio transducer positioned in a different plane than the first audio transducer.

8. The method of claim 1 further comprising amplifying the differences between the first and second signals.

9. A computing device comprising:
a processor;
a storage device coupled to the processor, the storage device storing instructions executable by the processor to determine a proximity of the device to another object based on audio signals; and
a first audio transducer configured to sense ambient sound waves and convert the sensed sound waves into a first electrical data signal, wherein the device is configured to store the first electrical data signal from the first audio transducer and a second electrical data signal representative of additional sound waves, wherein the processor is configured to determine if differences between the first and second electrical data signals indicate that the first audio transducer is proximately located to an object external to the device, wherein the object does not emit the additional sound waves or the ambient sound waves sensed by the first audio transducer and converted into the first electrical data signal.

10. The computing device of claim 9 further comprising at least one other audio transducer configured to sense ambient sound waves and convert the sensed sound waves into an electrical data signal, wherein the processor is configured to compare electrical data signals from the at least one other audio transducer with electrical data signals from the first audio transducer.

11. The computing device of claim 10, wherein one of the at least one other audio transducer is configured to function as a speaker.

12. The computing device of claim 10, wherein one of the at least one other audio transducer is provided in a capsule adjacent to a speaker of the device, wherein the capsule is shaped to resonate sound waves within a desired frequency band.

13. The computing device of claim 9, wherein the at least one other audio transducer is positioned within the device in a different plane from a plane in which the first audio transducer is positioned.

14. The computing device of claim 9, wherein the at least one other audio transducer is positioned adjacent to the first audio transducer.

15. The computing device of claim 14, wherein the first audio transducer comprises an omnidirectional transducer and the at least one other audio transducer comprises a directional transducer.

16. A communication device configured to passively determine proximity to other objects, the communication device comprising:
a multi-sided housing having an aperture to allow for receipt and transmission of sound waves therethrough;
an audio transducer located within the housing adjacent to the aperture, wherein the audio transducer is configured to sense ambient sound waves; and
a processor configured to evaluate signals generated by the audio transducer to determine if the device is in proximity to other objects based on at least one of:
a narrowing of a spike about a frequency and an amplification of a spike about a frequency.

17. The communication device of claim 16 wherein the aperture is configured to resonate sound waves that are at frequencies utilized to determine proximity.

18. The communication device of claim 16 further comprising at least one audio transducer positioned in each surface plane of the multi-sided housing.

19. The communication device of claim 16 wherein the audio transducer comprises a directional microphone.

20. The communication device of claim 16 wherein the processor is configured to evaluate the signals generated by the audio transducer to determine if the device is in proximity to other objects based a narrowing of a spike about a frequency.

21. The communication device of claim 16 wherein the processor is configured to evaluate the signals generated by the audio transducer to determine if the device is in proximity to other objects based an amplification of a spike about a frequency.

* * * * *